United States Patent

Golden

[15] 3,639,938
[45] Feb. 8, 1972

[54] WINDSHIELD-CLEANING SYSTEM

[72] Inventor: Gerald J. Golden, 875 Comstock, Apt. 4A, Los Angeles, Calif. 90024

[22] Filed: Oct. 15, 1969

[21] Appl. No.: 866,476

[52] U.S. Cl.....................15/250.06, 15/250.36, 15/250.4, 219/203
[51] Int. Cl...........................................B60s 1/38, A471 1/16
[58] Field of Search.................15/250.05, 250.06, 250.07, 15/250.08, 250.09, 250.12; 219/203, 522

[56] References Cited

UNITED STATES PATENTS

| | | | |
|---|---|---|---|
| 2,427,502 | 9/1947 | Marick | 15/250.06 |
| 2,721,351 | 10/1955 | Nitzel et al. | 15/250.06 |
| 2,903,732 | 9/1959 | Taylor et al. | 15/250.06 |
| 3,195,161 | 7/1965 | Haluck et al. | 15/250.06 |
| 3,201,818 | 8/1965 | Linker | 15/250.06 |
| 3,409,930 | 11/1968 | Linker | 15/250.09 X |
| 3,419,932 | 1/1969 | Linker | 15/250.06 |
| 3,428,993 | 2/1969 | Rickett | 15/250.06 |
| 3,461,477 | 8/1969 | Ikner | 15/250.06 |
| 3,489,884 | 1/1970 | Waseleski, Jr. | 15/250.05 X |
| 3,524,044 | 8/1970 | Liardi | 219/203 |

*Primary Examiner*—Peter Feldman
*Attorney*—Fraser and Bogucki

[57] ABSTRACT

A windshield-cleaning system, especially useful for cleaning automobile windshields of layers of adhering ice, is disclosed. The system includes wiper blades each having electrical heating means embedded within the blade to establish a heating zone on the portions of the blade surface adapted to contact the windshield. The wiper blade is normally curved and is transversely and longitudinally flexible so as to readily conform to the surface to be wiped despite the presence of the embedded heating means. The heating means may take the form of a number of flexible resistance wires in an array in close proximity to the wiping surfaces of the blade and connected to an external supply circuit through wires having high fatigue strength. The blades are driven across the windshield by an electromechanical system whose operation may be controlled independently of the blade heating circuit. An automatic control circuit for energizing the wiper-heating wires when the windshield temperature drops below a predetermined level during operation of the wiper drive mechanism, is also disclosed.

13 Claims, 11 Drawing Figures

SHEET 1 OF 3
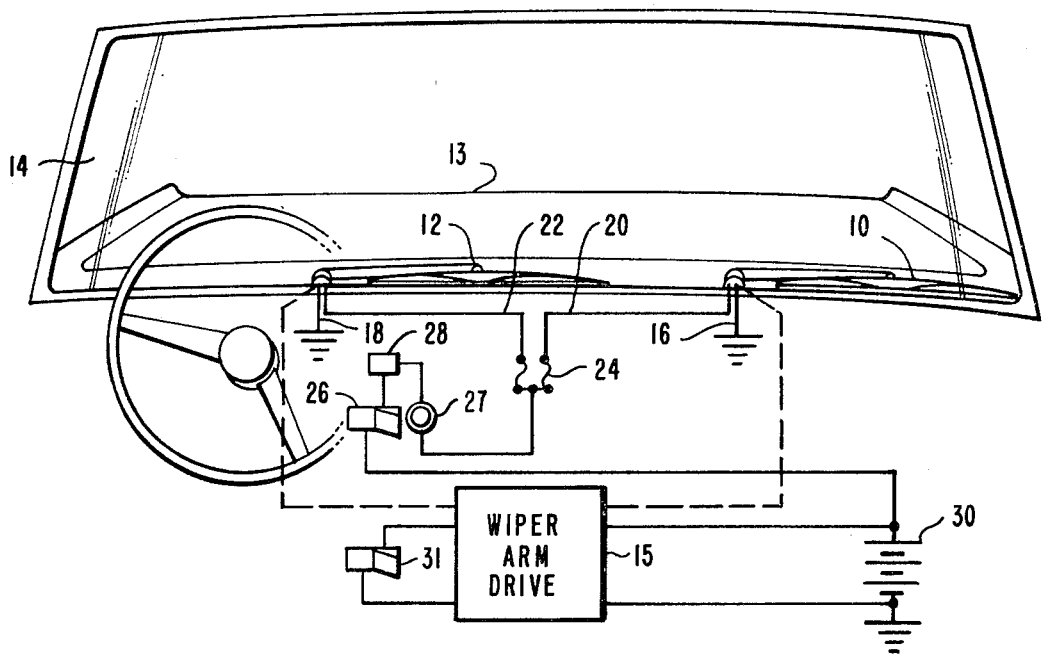
FIG.—1
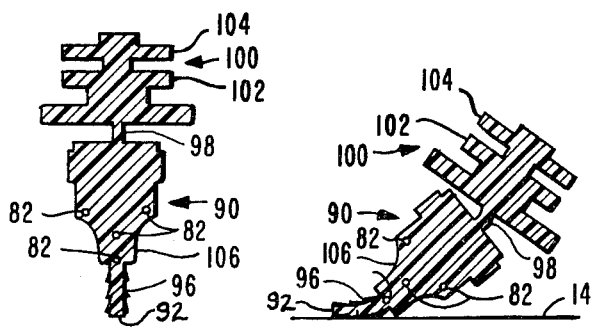
FIG.—5   FIG.—6
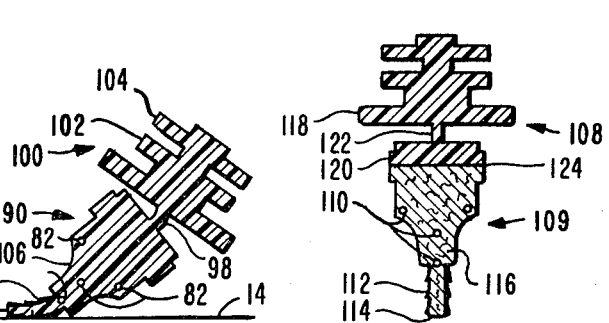
FIG.—9
FIG.—10
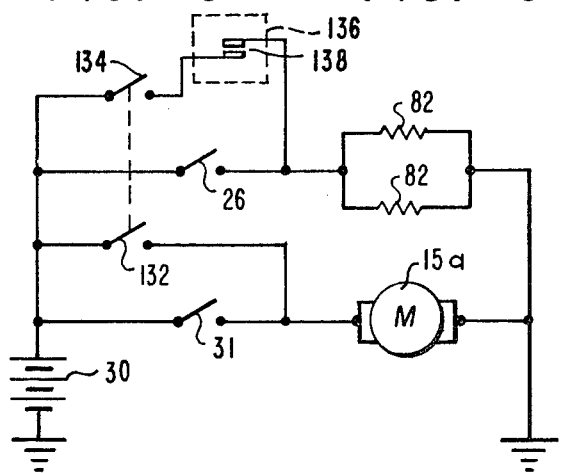
FIG.—11
INVENTOR.
GERALD J. GOLDEN
BY
FRASER & BOGUCKI
ATTORNEYS INVENTOR.
GERALD J. GOLDEN
BY
Fraser & Bogucki
ATTORNEYS

INVENTOR.
GERALD J. GOLDEN
BY
FRASER & BOGUCKI
ATTORNEYS

WINDSHIELD-CLEANING SYSTEM

BACKGROUND OF THE INVENTION

1. Field of the Invention

The present invention relates generally to systems and devices for cleaning transparent surfaces and particularly to heatable windshield wiper blades for clearing ice or other foreign matter from automobile windshields.

2. Description of the Prior Art

Existing heatable systems for clearing foreign matter, particularly ice, from automobile windshields fall into several categories. One type seeks to provide heat to melt the ice through a flow of heated fluid in conjunction with the mechanical wiping action of the associated wiper. Another type utilizes electrical resistance wires connected to an external source of current for providing thermal energy by resistive heating. Devices of the fluid heat carrier type are usually unwieldy and complex, particularly in the arrangements for circulating, heating and storing the circulating heat transfer fluid. Devices of the electrical resistance type have been more successful but they too have certain drawbacks. For example, in systems wherein the wires are external of the windshield wiper blade these drawbacks include the complexity of the mechanical arrangement for mounting the wires, the hampering effect of the external wires on longitudinal flex and transverse flex of the wiper blade, which flex actions are necessary for efficient cleaning action since they allow close conformity of the blade wiping surface to the windshield surface to be cleared during wiping, and misdirection of heat energy so that much heat is inefficiently absorbed in the unit itself or otherwise transferred to the environment instead of being directed toward the windshield. Devices of the prior art which utilize electrical resistance wires embedded within the wiper blade have the same drawbacks as those having external wires, but to a different degree. For example, although known embedded wire wipers may have lower heat loss because more of the heat may be directed toward the wiper, the embedded wire generally causes a severe loss of longitudinal flex since the bending characteristic of the wires differs substantially from that of the wiper blade itself.

Other problems encountered by existing heated windshield wipers utilizing electrical resistance wires for heat production have been the structural stress upon the wire connection to the automobile power source due to the continuing oscillatory motion of the wiper. The repeated stresses soon cause fatigue failure of such wires. Another problem is that the thermal characteristics of prior art wiper blade materials most commonly used, for example, rubber, readily deteriorate when subjected to heat. Such blades are only heated to relatively low temperatures to avoid premature deterioration. Further, many commonly used wiper materials have inappropriate specific heats so that they tend to take too long to heat or cool.

SUMMARY OF THE INVENTION

A windshield cleaning system is provided for clearing windshields of debris, particularly ice and frost. The system includes a windshield wiper blade formed with a curvature to conform approximately to the curvature of the windshield. A heating element, which may comprise a plurality of electrical resistance wires, is embedded in the wiping blade and disposed relative to the blade surface to form a heating zone in the wiping portion of the wiper blade. The embedded wires, which are flexible and may be of small diameter, are disposed in a specific pattern proximate the exterior surfaces of the wiping portion of the wiper blade and are connected at each end of the blade to external wires coupled to a power source and ground. The external wires are of relatively large diameter and have an exceptionally high fatigue life. The wiping portion of the wiper blade may be formed of material of relatively high heat conductivity and in one embodiment is thermally insulated from the rest of the wiper blade.

An aspect of the invention is the normally concave contour of the wiping portion of the wiper blade to match the convex curvature of the windshield surface to be wiped. Wiping portions of wiper blades in accordance with the invention thus undergo substantially less longitudinal flexing in conforming to the contours of surfaces to be wiped than existing straight blades. Also, in contrast to existing straight wiper blades, much of the flexure which does occur comprises a lessening of blade concavity, i.e., straightening, as the blade encounters windshield portions of smaller curvature. Therefore, stress upon wiper blade elements due to longitudinal flexing is substantially smaller than that upon existing straight blades. Further, wrinkling of the wiper blade, particularly of the wiping edge, that occurs in straight blades under the continuing bending accompanying the wiping action does not occur in wipers in accordance with the invention, which are in effect stretched rather than bent in traversing curved windshields.

A further aspect of the invention is the disposition of the embedded resistance wires within the wiper blade. The location of the wires so as to be proximate the wiping surfaces directs substantial portions of the heat generated by the electrical resistance wires to the wiper portions of the blade and therefrom to the windshield. Thus, efficiency of power consumption and cleaning action is achieved.

Another aspect of the invention is the employment of large diameter flex wire coupling the wiper heating elements to the external power source. The large diameter provides a low-resistance electrical path as well as providing substantial flex strength to withstand the stresses imposed upon the external wires by the continuous oscillatory motion of the wiper blade.

An additional aspect of the invention is the specific disposition of a multiplicity of thin and flexible embedded resistance wires which facilitate longitudinal flex of the wiper blade. These wires, because of the concavity of the blade and their small dimensions can be disposed adjacent the wiping areas of the blade without impairing the flexibility thereof.

Still another aspect of the present invention relates to the connection of the embedded heating wires with the external lead-in wire supplying electrical power to the embedded wires. Each tip of the wiper blade is stepped and notched so as to expose the ends of the embedded wires. The wire ends are bent upwardly within the stepped portion of the blade tip to surround the lead-in wire and are mechanically secured to the lead-in wire by suitable insulating means such as a length of heat-shrinkable sleeve slipped over the portion of the ends of the heating wires grasping the lead-in wire. The notch is then filled with a suitable insulative bonding agent such as an epoxy.

The wiper blade heater circuit and the wiper blade drive motor are normally controlled independently by separate switches. Thus, in the event the blades are frozen to the windshield, the heater circuit is turned on to quickly melt the ice restraining the blades. The blade drive motor is then turned on. Because of the relatively high-operating temperatures of heated blades according to the present invention, any ice adhering to the windshield is rapidly melted as the blades traverse the windshield.

An automatic control system forms another aspect of the invention. Both the heater and drive motor switches are shunted by a third switch means operable in part in response to the output of a transducer coupled to sense windshield surface temperature. When automatic control operation is selected, the wiper blade drive motor is energized. If and when the windshield surface temperature drops to a predetermined level, for example, 32° F., the wiper blade heater element circuit is energized to keep the swept portion of the windshield free of ice accumulations.

BRIEF DESCRIPTION OF THE DRAWINGS

Further objects and aspects of the present invention will be found in the "Detailed Description," below, which makes reference to the accompanying drawings in which:

FIG. 1 is a perspective view of the front portion of an automobile, including the windshield, and includes a schematic representation of the windshield wiper arm drive system and the wiper heating element circuit;

FIG. 5 is a transverse cross section of the blade shown in FIG. 3;

FIG. 6 is a transverse cross section of the blade of FIG. 3 as it appears during the wiping operation;

FIG. 9 is a transverse cross section of an alternative embodiment of the wiper blades of the present invention;

FIG. 10 is a transverse cross section of another alternative embodiment of the wiper blade of the present invention; and FIG. 11 is a somewhat simplified circuit schematic of the wiper motor drive and blade heating systems in accordance with an alternative embodiment of the invention.

DETAILED DESCRIPTION OF THE INVENTION

Figure 3:
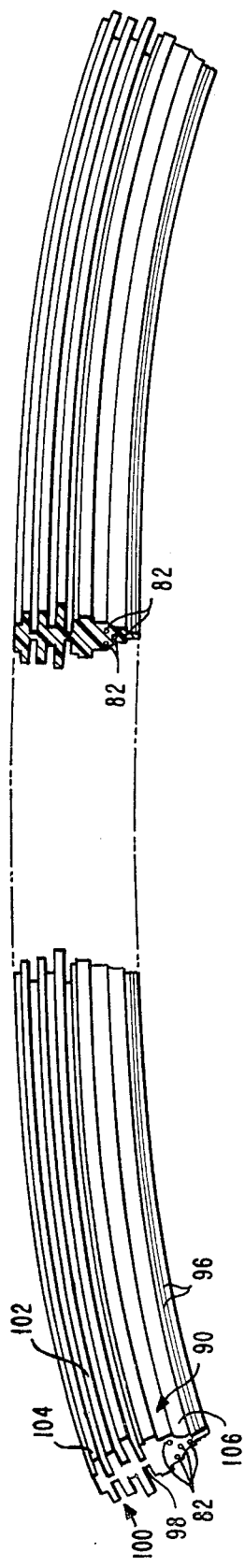
FIG. 3 is a perspective view, partly broken away, of a wiper blade incorporating features of the invention.

In FIGS. 1–8 an example is shown of a heated wiper blade system in accordance with the invention. The particular system shown is for use generally in cooperation with a transparent surface of a large area and which has a high curvature which may be compound in nature. Though the wiper system of the invention may be used in conjunction with windshields of ships, airplanes, and so forth, and may be modified to conform to stylistic or other requirements, for convenience the wiper system in accordance with the invention is discussed within the context of use with an automobile windshield.

Dual wiper assemblies 10, 12 mounted adjacent the hood 13 of an automobile at the base of a windshield 14 are actuated by conventional electrical, pneumatic, hydraulic, or vacuum drive means. By way of example, an electric wiper arm drive 15 is shown which provides the required reciprocating wiping action. Arm drive 15 is connected to a power source 30, in this example the vehicle battery. As best seen in FIG. 1, an electric circuit is completed for each wiper assembly 10, 12 by electrical connections 16, 18 respectively extending from the hood mounting point to the dash region of the vehicle. Specifically, at least one conductor 20, 22 runs from each wiper assembly 10, 12 respectively to a fuse 24. Coupled to fuse 24 are a power control means 26 which may include an indicator light or other warning signal 27, a safety connection 28 of conventional type such as a delayed relay circuit, and the source of power 30.

The power control 26 controls wiper heating current only. A separate switch 31 controls the wiper drive circuit. The separation of heating and mechanical action is of substantial utility when the wiper system is frozen to the windshield, as will be described below.

Figure 2:
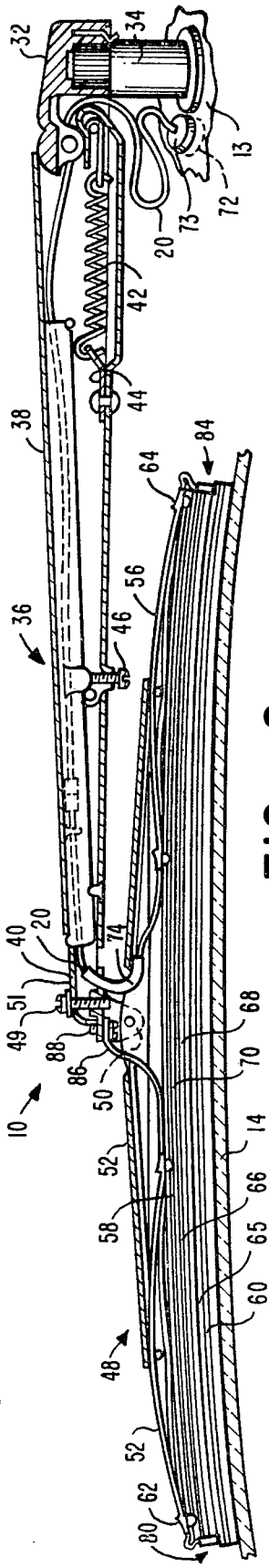
FIG. 2 is a longitudinal cross section of a wiper arm and blade assembly in accordance with certain aspects of the invention.

Since the wiper assemblies 10 and 12 are identical, only one will be described in detail. As best seen in FIG. 2, wiper assembly 10 comprises an internally splined fitting 32 for mating with a conventional splined wiper drive hub 34 projecting through the hood 13. A wiper blade arm assembly 36 comprises a first, hollow arm 38 pivotally connected to fitting 32 and a second hollow arm 40 slidably mounted within the first arm 38. Pressure of the wiper blade upon the windshield 14 is adjustably controlled by a coil spring 42 connected at one end to the fitting 32 and at the other end to a tab 44 comprising one of a series (not shown) of pressure adjusting tabs disposed within the first hollow arm 38.

The length of the driving mechanism 36 is variable depending on the relationship of the first hollow arm 38 with the second hollow arm 40 by sliding the second arm 40 in telescoping fashion within the arm 38. A setscrew 46 disposed within the first hollow arm 38 when tightened frictionally engages the second arm to fix the arms in appropriate relationship to provide a desired overall length of the arm assembly 36.

At the outer end of the arm assembly 36, a blade support assembly 48 is mounted by conventional mechanical means shown here as a riveted bracket joint 50 riveted to the blade support assembly 48. Connection to the arm assembly 36 may be detachable, as by a screw 49 shown here, to allow replacement of the blade support assembly 48. Matching serrations and notches 51 on the underside of the outer end of the arm assembly 36 and the top of the bracket joint 50 provide adjustability of the angle between the driving mechanism and the blade support assembly 48.

The blade support assembly 48 comprises typically a hollow primary yoke 52, hollow secondary yokes 54, 56, and a flexible blade support member 58 affixed to a wiper blade element 60. The primary yoke 52 transmits mechanical energy from the driving arm mechanism 36 through the secondary yokes 54, 56 to the wiper blade element 60 to draw the blade 60 across the windshield 14. In a conventional manner, the secondary yokes 54, 56 are slidably affixed to the blade support member 58 so that by sliding along the blade support 58, the secondary yokes 54, 56 can accommodate the natural changes of longitudinal curvature of the wiper blade element 60 as it encounters differing curvatures in its path across the windshield 14. In conventional fashion, outer ends 62, 64 of the secondary yokes 54, 56 respectively are fastened to the wiper blade element 60 through frictional engagement with grooves 65, 66 in the blade. The blade support member 58 is attached to the wiper blade element 60 by frictional engagement with longitudinal flanges 68, 70 best seen in FIG. 5 disposed on either side of the blade element 60. The connection is somewhat loose to allow the transverse flexing, squeegee action desirable for efficient wiping.

Electrical connection between the power source, the battery 30, and the wiper blade is achieved through the conductor 20 which typically passes through an aperture 72 in the hood 13 specially drilled for the purpose. Alternatively, of course, any appropriately situated preexisting aperture, such as a grille, may be utilized. The wire proceeds to the interior of the vehicle along a path (not shown) which may include a specially drilled aperture in the firewall (not shown). An alternative path in a typical passenger car not requiring drilling might extend through the interior of a fender, a door jamb and the front kick panel of the interior of the vehicle. Other paths may, of course, be employed. A grommet 73, (FIG. 2) may be inserted through the aperture 72 for protection of the wire against abrasion and for weather sealing.

Exteriorly, the wire 20 is of high flex strength as required by the continuing movement of the blade assembly to which the wire is affixed, which movement in effect tends to bend the wire back and forth rapidly and repeatedly. This high flex strength is achieved by configuring the wire to be of relatively large diameter and fabricating it of relatively highly flexible and stress-resistant components. These components may be finely drawn, multistranded, pure soft copper or copper alloys such as beryllium-copper or phosphor-bronze. The large diameter of the wire serves a dual purpose in that it also provides an electrical path of relatively low resistance to allow a relatively high heating current (20 amps in one practical example). The wire 20 passes through the hollow interior of the arm assembly 36. Because of the extensibility of the arm assembly 36, in most positions of the mechanism, the wire will not be taut. Thus, the wire will coil within the hollow interior of the arm assembly which is of appropriate dimensions to contain the slack wire. The wire 20 passes to the detachable connection 48 at the outer end of the second hollow arm 40, through the hollow primary yoke, and through the hollow secondary yoke 54. A detachable electrical connection 74 comprising a male/female connector plug is disposed in the wire path before the detachable mechanical connection 48 to facilitate replacement of the electrical and mechanical components of the blade mechanism. The connection 74 as shown here as being disposed in the primary yoke 54 adjacent the mechanical connection 48.

Figure 4:
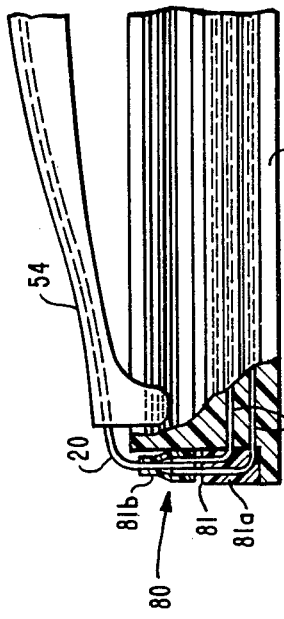
FIG. 4 is a side view, partly in section, of the end portion of a wiper blade in accordance with the present invention.

Referring now also to FIG. 4, from the secondary yoke 54 the conductor 20 passes to a connection 80 at the tip of the wiper blade 60. In the embodiment under discussion, the blade 60 has embedded in it a plurality of longitudinally extending wires 82. In order to effect the connection between these wires and the conductor 20, a portion of the blade tip is cut back to form a step 81 and notched at 81a to expose the ends of the wires 82. The ends of the wires 82 are then bent upwardly so that they project slightly into the stepped region 81 and bunched together about the downwardly directed end of the wire 20. The wires 82 and 20 are mechanically coupled by a heat-shrinkable sleeve 81b, previously slipped over the end of the wire 20 and shrunk over the overlapping portions of the wires 82 and 20 to effect a secure connection. The notch 81a is filled with a suitable potting or bonding compound.

Alternatively, the connection may be made by twisting the interior and exterior wires 82 and 20, respectively, together and soldering them. Another technique which may be utilized is the method of interiorly welding the interior wires 82 to the exterior wire 20 when the interior wires 82 are extruded in the blade 60 thus obviating the necessity of stripping end portions of the blade 60 to expose the wires 82 for soldering or other type of electrical connection. Other means, of course, may also be employed, such as a clamp fixed to the wiper blade across the connection at the end.

A similar connection 84 is made at the opposite tip of the wiper blade 60, from which point an exterior ground wire 86 similar to wire 20, is connected to ground point 88 adjacent the primary yoke 52.

As best seen in FIG. 3, the wiper blade 60 comprises a lower, operative wiping portion 90. This lower operative wiping portion includes a wiping edge 92 which is pressed into contact with the windshield 14 by the driving mechanism spring arrangement when the blade is in a normal, unflexed condition as shown in FIG. 6. Also included in the lower wiping portion is a depending flex region 94, terminating at the edge 92. Longitudinal arrisses 96 comprising wiping surfaces are disposed laterally along the flex region 94. The arrisses 96 make wiping contact with the windshield 14 during transverse flexing of the wiper blade 60 wherein the lower wiping portion passes in a squeegee action across the windshield as best shown in FIG. 6. A thin neck or web 98 connects the lower wiping portion 90 to an upper support portion 100 of the wiper blade 60. Flanges 102, 104 in the upper and lower wiper portions, respectively, define a lateral volume adjacent the web 98 and define the range of transverse flex during wiping by their collision with one another at an extreme range of flex around the neck 98.

The wires 82 are disposed adjacent the arrisses 96 and proximate the operative edge 92 and are shown as forming a "Y" configuration. As further discussed below, the material of the wiper blade 60 is of relatively low heat conductivity. Consequently, little heat is conducted to the nonwiping portions of the wiper blade 60 from the wires 82. An operative heating zone 106, defined substantially in the vicinity of, and by the wires 82 in the lower part of the flex region 94, is thus substantially thermally isolated from the rest of the wiper blade. The relatively small amount of wiper blade material separating the wires 82 from the surface to be wiped does not significantly impair heat flow. Thus, because of their disposition adjacent the operating surfaces of the wiper blade 60, the electrical resistance wires 82 generate heat which is efficiently directed toward the surface to be wiped instead of being dissipated to the nonwiping portions of the wiper and to the environment. Wiping effectiveness of the blade is not sacrificed, however, as in existing arrangements of embedded wires in normally straight wiper elements wherein the stiffness introduced into the wiper element by the relatively inflexible wires impedes flexing of the wiper element to conform the wiping surfaces to the surface to be wiped and sets up mechanical stresses within the wiper due to differing flexibility of the wiper blade and the wires. Loss of wiping effectiveness becomes more pronounced with proximity of the wires to thinner portions of the wiper blade. By contrast, in systems in accordance with the invention, the wiper blade 60 may be fabricated to have a normally concave contour with respect to the convex curvature of a normal windshield. This curvature has a dual aspect. It eliminates the necessity of substantial longitudinal flexing to accommodate changing windshield wiper curvature in the wiping path which normally straight, uncurved wiper elements must undergo, thus substantially diminishing flexing and the deleterious effects thereof. Further, this curvature which is calculated to represent substantially the greatest curvature to be encountered on a windshield, has the effect of causing a longitudinal flex not toward a concave curvature as with normal straight blades but toward a less concave curvature as it encounters less curved windshield portions. Thus, wipers in accordance with the invention avoid the common problem of wrinkling of the wiper blade edge upon concave flexing or bending to conform to curved windshield portions; here, the flexing represents a straightening and diminishing of the curvature comprising a stretching of the operative wiping surfaces. The wiper material has high resilience: full restoration of the normal length and curvature is achieved after stretching.

A further aspect tending to make for superior wiping action even in the presence of wires embedded in the operative wiping portion is in the characteristics of the wires. These wires are of small cross-sectional area and are thus relatively flexible. In the embodiment shown, there are four wires comprising the multiplicity of wires 82 each of which has one-quarter of the cross-sectional area of the exterior wires 20, 86. Electrical resistive and heating characteristics of the circuit are preserved in that the resistance of the four wires is approximately equal to the resistance of one wire such as the exterior wire 20 whose cross-sectional area is equal to the total of those of the individual wires. Such a large diameter wire if embedded in the blade element 60 would produce excessive stiffness hampering longitudinal flexing. As an added advantage in systems in accordance with the invention, such thin wires can, because of their small dimensions, be disposed adjacent a wiping surface for efficient heat distribution as described above. This is in contrast to existing systems utilizing such thin wires wherein, to preserve flex, disposition must be made in much more central regions of the blade or in special flexible centrally disposed tubes, with all of the heat distribution inefficiency this implies.

Systems in accordance with the invention thus surmount the most formidable obstacles to the success of electrically heated windshield wipers by combining electrical, mechanical, and thermal considerations to provide efficient heating with efficient wiping action.

The wiper element 60 may be of silicone resin or other material with desirable thermal properties. The silicone wiper blade can heat and cool rapidly. In a practical example of a wiper in accordance with the invention, a temperature of 380° F. was achieved in 5 seconds using a 20 amp current, and substantial cooling to ambient temperature was achieved after cessation of the current in the same time period. Further, the relatively poorly heat conductive silicone effectively prevents heat flow from the wires to the nonwiping portions of the wiper blade 60 as discussed above. Resistance to shearing stress, i.e., tearing, of the silicone is also important since the blade must pass repetitively over the rough, irregular surface presented by ice encrusted on a windshield.

Figure 7:
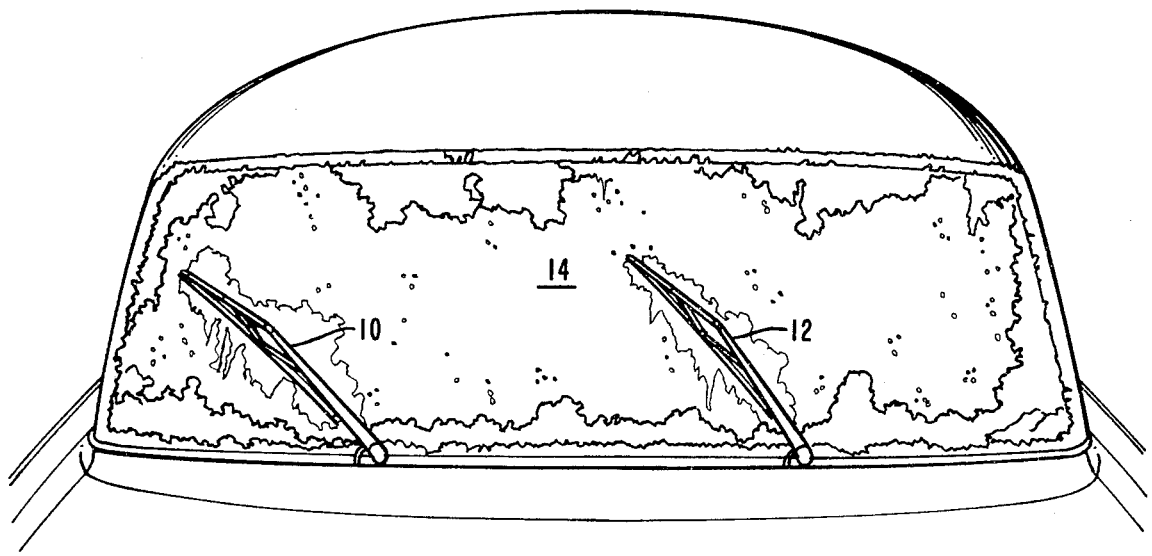
FIG. 7 is a perspective view of the front portion of an automobile showing the windshield wiper blades of the present invention frozen to the windshield, prior to operation.
Figure 8:
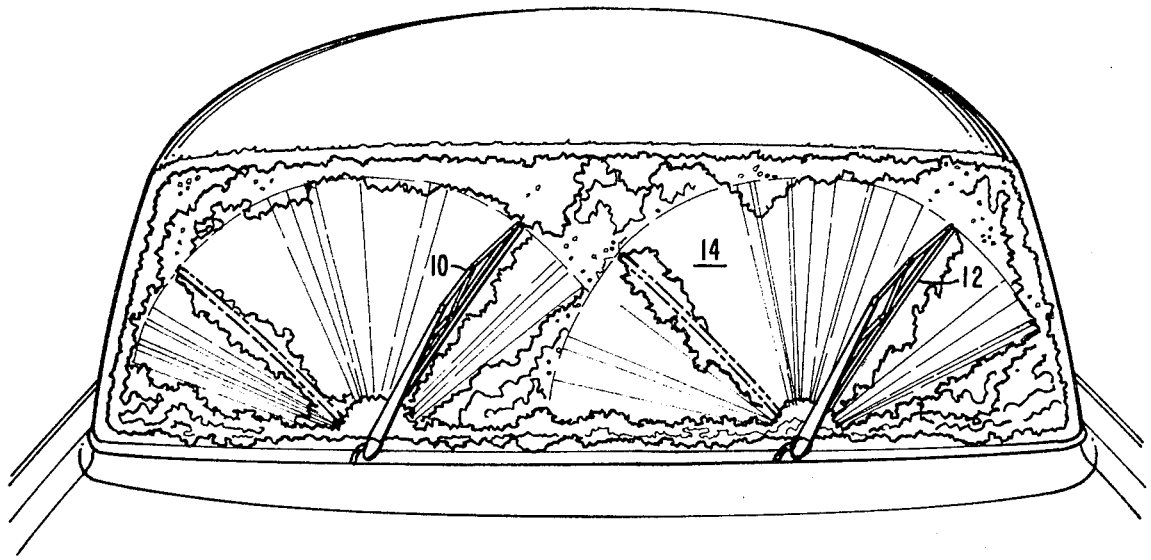
FIG. 8 shows the state of the windshield of the automobile of FIG. 7 after a short period of operation of the heated blades.

FIGS. 7 and 8 in conjunction with FIG. 1 illustrate the operation of a wiper system in accordance with the invention. In FIG. 7 the wipers 10, 12 are shown frozen to the windshield 14, which is covered with a rough, irregular deposit of ice.

Shortly after the power control switch 26 is moved to the "on" position, wiper blade operative wiping portions 90 of wipers 10, 12 respectively, heat to about 380° F. In one practical example, with a conventional automobile 12 volt battery as power source, this temperature was achieved in about five seconds. The blades 10, 12 are allowed to remain stationary until freed from the windshield 14. At this point, reciprocating motion of the wipers 10, 12 across the ice-encrusted windshield 14 is initiated by actuating the separate switch 31 controlling operation of the wipers 10, 12. In a practical example of use of a wiper system in accordance with the invention, the blade was freed in about thirty seconds. As shown in FIG. 8, the wipers pass in contact with the ice layer, heating and melting it, and finally wipe the melted ice off the windshield. Sufficient heat is conducted, of course, to nonwiping portions of the wipers 10, 12 to remove, or prevent the formation of any ice thereupon.

FIG. 9 illustrates an alternative embodiment of a wiper blade in accordance with the invention. In this embodiment, a lower wiping portion 109 of a blade 108 includes a plurality (shown as four) of embedded resistance wires 110 disposed adjacent lateral longitudinal wiping surfaces 112 and proximate an operative wiping edge 114. The material of the lower wiper portion 109 forms an operative heating zone 116 defined by the embedded wires 110 and comprises fibrous or particulate carbon or other superior heat conductive material dispersed in a silicone matrix. An insulative material, such as rubber, comprises the nonwiping portion 118 of the wiper element 108 including an upper transition portion 120 of the operative wiping portion 109 leading to a web or neck 122. In this embodiment, the upper and lower portions of the wiping portion 109 of the blade 108 are fabricated separately and attached along a join region 124 located approximately one-half of the distance between the neck 122 and the wiper edge 114. In this manner, extremely efficient utilization of heat is achieved in that virtually all of the heat given off by the electrical resistance wires 110 is directed toward the surface to be wiped (not shown) and only enough heat is directed to the rest of the wiper to prevent ice or snow from forming on the nonwiping portion 118 and impairing wiping action. The connection at the join region 124 is accomplished by conventional means such as vulcanization, heat treatment, curing, etc. A gradation along the length of the wipers in heat conductivity, increasing as the outer longitudinal wiper ends are approached can be achieved by appropriate, conventional methods of material fabrication to compensate for varying path length, and therefore heat requirements, which increase with proximity to the outer ends.

Another alternative blade embodiment is shown in FIG. 10. The entire blade 126 of this embodiment is fabricated of a relatively good insulator material such as silicone. Completely embedded within the blade 126 and extruded therewith during fabrication is an electrically conductive resistive layer 128 which may comprise a plastic material such as a conductive epoxy resin. The conductive layer 128 closely follows the contour of the blade surface and is disposed immediately adjacent thereto and has sufficient electrical resistance to establish a heating zone 130 along the surface when current is passed therethrough. The conductive layer is suitably connected to an external power supply by means not shown.

FIG. 11 shows a somewhat simplified schematic of an automatic control system for controlling the operation of the wiper heating elements in response to the temperature of the windshield. In FIG. 11, those elements having counterparts in FIG. 1 have been given identical reference numerals. Thus, the wiper drive motor 15a and the heater elements 82 are connected in parallel to receive power from the battery 30 through switches 31 and 26, respectively. The switches 26 and 31 are operable independently to energize either the wiper heater elements 82 or the motor 15a or both. A switch 132 is connected across the switch motor switch 31 and is ganged to another switch 134 coupled in a branch shunting heater switch 26. Temperature sensing means 136, including switching contacts 138, is mounted to sense the temperature of the outer surface of the windshield 14. The temperature sensing means 136 may take the form of a conventional thermostat including a bimetallic temperature-sensitive element coupled to actuate the switching contacts. The temperature sensing means 136 is present to close the contacts when the windshield surface temperature drops to a predetermined level, such as 32° F. For automatic control operation, ganged switches 132, 134 are closed thereby starting the wiper motor 15a. If and when the windshield surface temperature drops to the predetermined level, contacts 138 close whereby heater elements 82 are energized. Should the windshield surface temperature rise due to a change in ambient conditions, the temperature-controlled switching contacts 138 open to deenergize the heater elements 82.

Wiper system in accordance with the invention may differ in arrangement from those discussed above. For example, a wiper in accordance with the invention having a relatively low profile and relatively shallow base mounting can be used in conjunction with recessed windshields. A pantograph such as that shown and claimed in the expired U.S. Patent to Leroy J. Carey, No. 2,412,319 (1946) may also be utilized to restrict the movement of the wiper blade to portions of the windshield above the recess. Wiper systems in accordance with the invention are, of course, not restricted to use in ice removal. Such wiper systems may be employed, for example, in conjunction with cleansing chemicals to clear a windshield or other viewing surface of insects or other airborne debris.

Therefore, the claimed invention is to be construed as comprehending all equivalent arrangements to, and insubstantial variations of, the embodiments specifically described and shown.

What is claimed is:

1. A wiper blade comprising:
   a long, flexible body concavely curved with respect to a surface to be wiped longitudinally, said body having an operative generally wedge shaped wiping portion of nonheat conductive material comprising a squeegee wiper edge and a lateral flexing region having lateral wiping surfaces for making wiping contact with the surface to be wiped during transverse flexing and being connected with said wiping edge and with a nonwiping portion of the wiper blade by a thin web, said thin web being disposed between said wiping portion and said nonwiping portion and integrally connecting them, more than one longitudinally extending, electrical resistance element of relatively small cross section embedded directly in the narrowed portion of said wiping portion, said nonwiping portion having means for coupling the blade to means for driving the blade across the surface to be wiped.

2. The invention, as set forth in claim 1, wherein:
   said nonwiping portion is made of a material having a relatively low thermal conductivity and said wiping portion is made of a material having a relatively high thermal conductivity.

3. The invention, as set forth in claim 1, wherein said means for coupling the blade to said driving means comprises:
   a blade support assembly disposed in longitudinal grooves in said nonwiping portion and a drive transmitting assembly including secondary yokes associated with said blade support assembly to slide thereon to accommodate longitudinal flex of the blade, a hollow primary yoke attached to said secondary yokes and to a hollow driving arm associated with a driving means for driving the wiper across a windshield to be cleaned, and further including electrical conductors, one of said conductors being connected to a power source and passing through at least a portion of said drive transmitting assembly to an end of said wiper blade at which end said conductor is electrically connected to said resistance element, and another of said conductors coupling the other end of said resistance element with a ground point.

4. The invention, as set forth in claim 3, wherein:

the upper portion of said blade is cut back at each end of said blade to form a stepped region, and the lower portion of said blade at each end is notched below said stepped region to expose the end of said resistance element for connection to said conductors.

5. The invention, as set forth in claim 4, wherein:
at each end of said blade, said resistance element and said conductor overlap within the stepped region of said blade and are held in contact by insulating sleeve means.

6. A heated windshield wiper blade comprising:
a flexible cleaning element with a longitudinal dimension having a support portion for attachment to a source of mechanical energy to move said cleaning element across a surface to be cleaned and an operative cleaning portion of relatively poorly heat conductive material and generally wedge shaped cross section having cleaning surfaces including a cleaning edge at the thinnest portion for contacting the surface to be cleaned when said cleaning element is in a transversely unflexed state, and lateral side surfaces spaced apart from said cleaning edge for contacting the surface to be cleaned during transverse flexing of the cleaning element in motion;
and an electrical resistor network for heat generation including a number of longitudinal resistive wires embedded within said cleaning portion of said cleaning element and disposed within the wedge shaped cross section with individual ones adjacent said cleaning edge and said lateral side surfaces so that heat given off by said wires is concentrated within said cleaning portion of said cleaning element and has short path lengths to the associated surfaces.

7. The invention, as set forth in claim 6, wherein:
said resistive wires are of relatively small diameter and extruded within said cleaning element in a Y-pattern defining an operating heating zone adjacent said cleaning edge for transmitting heat to a windshield surface to be wiped.

8. The invention as set forth in claim 6, wherein:
said embedded wires are electrically connected to an external electrical power source by resistors of high flex strength comprising large diameter wires.

9. The invention, as set forth in claim 6, wherein:
said at least one embedded wire is electrically connected to an external electrical power source by finely drawn, multistranded conductor means.

10. The invention, as set forth in claim 7, wherein:
said wiping element in configured to be longitudinally concave in a relaxed state to conform to a convex windshield to be wiped.

11. The invention, as set forth in claim 6, wherein:
said resistive wires are disposed substantially in the smaller half of said wedge shaped cleaning element substantially the upper half thereof comprising a heat insulative matrix for preventing heat transfer away from said operative wiping portion toward the support portion and the environment.

12. A wiper blade system comprising:
a source of electrical power;
at least one heatable wiper blade having electrical resistance means embedded therein;
heater switch means coupled in series with said electrical resistance means, the series combination of said heater switch means and said electrical resistance means being connected across said power source;
means for driving said wiper blade across a surface to be cleaned, said driving means including an electric motor; and
motor switch means coupled in series with said electric motor, the series combination of said motor switch means and said electrical motor being connected across said power source and in parallel with the series combination of said heater switch means and said electrical resistance means, whereby said electrical resistance means and electric motor are operably independently of one another said heater switch means includes the series combination of an automatic control switch and switching means responsive to the temperature of said surface to be cleaned, said last mentioned series combination being connected in parallel with a manual heater control switch; and
said motor switch means includes the parallel combination of said automatic control switch and a manual motor control switch whereby said manual control switches permit independent, manual operation of said electrical resistance means and electric motor and said automatic control switch permits automatic operation of said electrical resistance means, during operation of said electric motor, in response to the temperature of said surface to be cleaned.

13. A wiper blade system, as defined in claim 12, wherein:
said switching means closes to conduct electrical current when the temperature of said surface to be cleaned drops to a predetermined level.

* * * * *